United States Patent [19]

Ciolfi

[11] 3,722,841
[45] Mar. 27, 1973

[54] FLAG HOLDER
[76] Inventor: Quentin P. Ciolfi, 5890 N.W. 114th St., Hialeah, Fla.
[22] Filed: Apr. 24, 1972
[21] Appl. No.: 247,001

[52] U.S. Cl..................248/43, 224/30 R, 224/39
[51] Int. Cl..............................F16m 13/02
[58] Field of Search.....................248/38–44; 224/30 R, 39, 42.45

[56] References Cited

UNITED STATES PATENTS

| 1,262,879 | 4/1918 | Waiteling | 248/42 |
| 1,276,496 | 8/1918 | Crosley | 248/42 |
| 2,952,343 | 9/1960 | Modrey | 248/43 UX |

Primary Examiner—William H. Schultz
Attorney—John Cyril Malloy

[57] ABSTRACT

A one piece holder for displaying a flag on a bicycle, for example. The holder includes: an elongate body having at least two spaced aligned socket defining portions each sized to snugly receive and frictionally retain a flag staff in upstanding relation; shield means to protectively partially house the staff of a flag held by the holder; mounting means for attachment of the holder to the threaded distal end of the axle shaft of the rear wheel of a bicycle, or for attachment to a similarly equipped vehicle, the mounting means comprising a through hole in one end of the body sized for passage of the axle shaft to be retained thereon by threaded advancement of a keeper nut; additionally for optional use, quick detach mounting means are provided in the form of a slot in the other end of the elongate body, the slot being sized to receive the axle shaft; and rigidifying means for the body to resist deformation of it in use.

4 Claims, 3 Drawing Figures

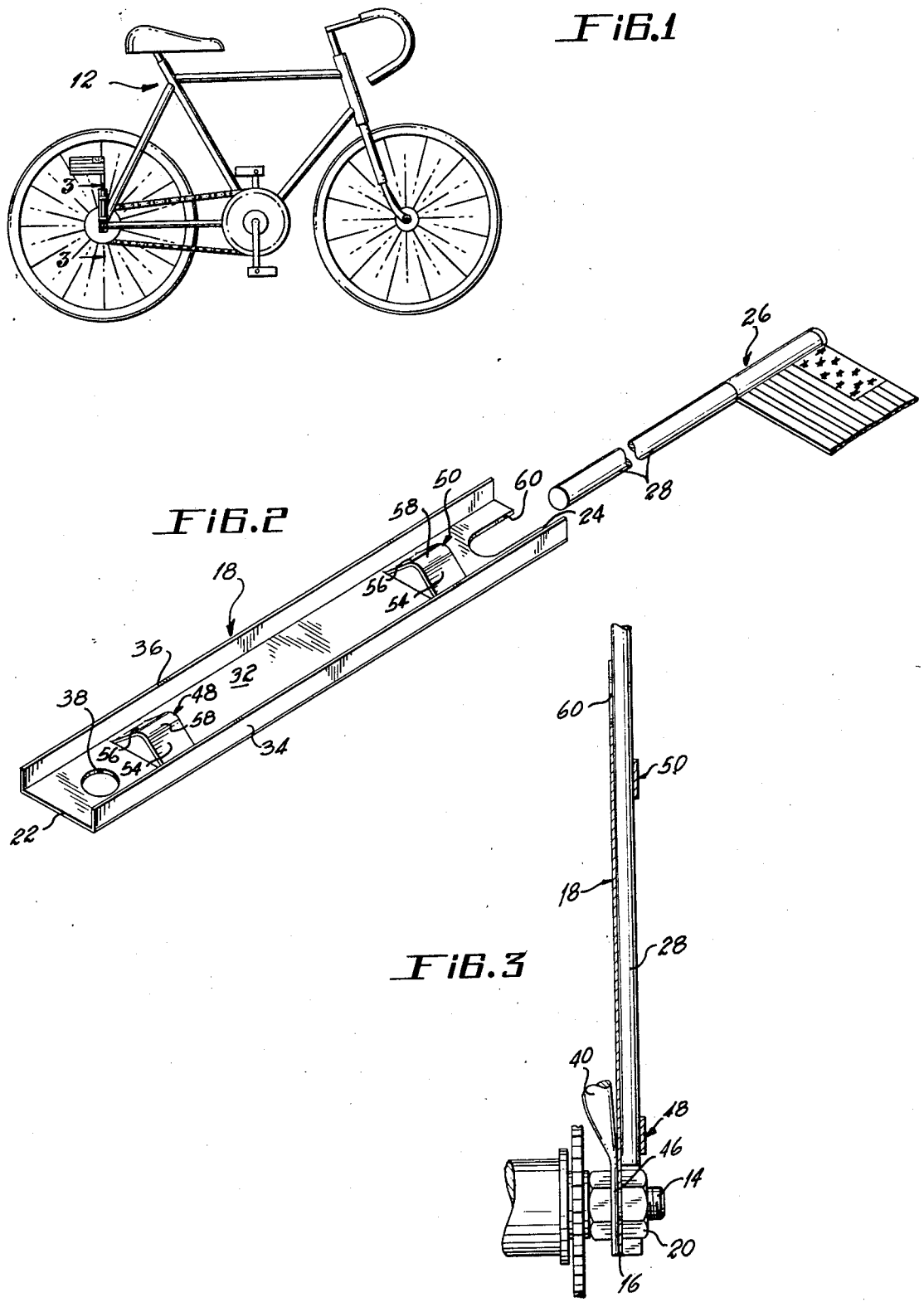

FLAG HOLDER

FIELD OF THE INVENTION

This invention relates to a flag holder; and more particularly, this invention relates to a flag holder which includes: mounting means for attachment to an extending threaded end of an axle shaft on a bicycle or other vehicle, such as a motorcycle, or boat; and holding means to hold a flag in upstanding relation for display on the vehicle as it travels at a relatively high velocity compared to a flag displayed and subjected only to the forces of wind at normal velocity.

DESCRIPTION OF THE PRIOR ART GENERALLY

As is perhaps well known, vehicle operators, particularly bicycle and motorcycle riders often display the American flag or other flag symbol on their vehicle which flags often because they are inexpensive have slender, relatively weak flag staffs. Because of the relatively high velocity exerted upon a flag and flag staff when mounted to a moving vehicle compared to that of a stationary flag staff, it has been a problem to provide an inexpensive holder for such flags which is adequate to orient the flag in a generally vertical attitude and to withstand the forces exerted upon it, and to lend support to the thin flag staff so that it does not easily break in use. Additionally, there has been a problem of frequent theft and vandalism of flag holders for such vehicles by those who, upon seeing a desirable flag holder, remove it from the owner's property while the vehicle is briefly unattended. In the past there have been numerous types of flag holders of varying design; however, this invention provides an improved flag holder which is inexpensive to manufacture, which is simple in construction, being of one piece construction, and which is adapted to be, at the option of the owner of the vehicle, mounted so that it can be quickly removed from the vehicle by a quick jerk, as is described more fully hereinafter, or, optionally, left on the vehicle and retained in place by a keeper nut so that one attempting to take the flag holder would be required to have a tool with him in order to loosen the flag holder and remove it.

OBJECTS OF THE INVENTION

It is an object of this invention to provide a one piece inexpensive flag holder with a pair of spaced aligned sockets sized to receive and retain a flag staff in a vertical position and to lend support along a significant length of the flag staff to reinforce it, and which includes mounting means for relatively secure attachment of the flag holder to a threaded member, such as an axle, protruding from a vehicle surface by a keeper nut, so that the holder cannot be removed except with the use of a tool, and which also includes an optional mounting means in the form of a slot in one end of the holder sized for receiving the threaded axle, but which can be removed from the axle by quickly jerking it upwardly to release it from the vehicle.

It is a more specific object of this invention to provide an improved one piece flag holder for a vehicle of the type described in the preceding paragraph which includes as socket defining means for the flag staff, an upper and a lower member in spaced relation, and each of which is pressed and folded out of the main plane of the elongate holder body to define a socket through which the flag staff is adapted to be snuggly passed and which provides support and together with flange shields on the holder protectively houses the staff against breakage by impact when parking a bicycle, etc.

In accordance with these and other objects which will become apparent hereinafter the instant invention will now be described with reference to the accompanying drawings:

DESCRIPTION OF THE DRAWINGS

FIG. 1 is a side elevation view of a bicycle with the flag holder mounted to the rear axle thereof;

FIG. 2 is a perspective view of the flag holder illustrating the same in relation to the staff of a flag; and FIG. 3 is a view in cross section taken on the plane indicated by the line 3—3 of FIG. 1 and looking in the direction of the arrows and illustrating the mounting of the flag staff to the rear axle of the bicycle of FIG. 1.

DESCRIPTION OF THE PREFERRED EMBODIMENT

Referring to the drawings wherein like reference characters designate like or corresponding parts throughout the several views, the numeral 12 generally designates a bicycle which has a rear axle shaft 14, see FIG. 3, the distal end of which is threaded and which extends from a generally vertical surface, indicated by the numeral 16. Otherwise stated, in a more general manner, it can be said that the numeral 12 generally designates a vehicle having a surface 16 which is generally vertical and from which there protrudes a threaded member 14. It is to this threaded member that the flag holder 18 is to be connected by passing the threaded member through an opening in the holder and clamping it in place by a keeper nut 20 threadably advanced to clamp one of the holder ends, either 22 or 24, to the member after it has been arranged in a generally vertical attitude, as illustrated in FIG. 1, to display the flag 26. With more specific reference to the holder, see FIG. 3, it is seen that it includes an elongate body of channel form, the web of which is designated by the numeral 32 and the flanges of which are designated by the numerals 34 and 36, the latter providing a longitudinal rigidifying means for the holder body. In the preferred embodiment, the holder is of metal, preferably sixteen gauge steel, or, alternatively, it is of rigid plastic of the class which includes polyvinyl chloride. The length of the body is preferably in the range of five to eight inches for use on bicycles or motorcycles and with the width of the web 32 being about one inch, while that of the rigidifying means or flanges is about one-quarter inch. Thus, there is provided a U-shaped space or nest to protectively shield the staff 28 of the flag between the flanges and web.

The mounting means adapting the holder for attachment to the protruding member 14 is for use in combination with the keeper nut 20 as will now be described. A hole 38 sized to receive the threaded portion of the member 14 is provided through one of the end zones of the body adjacent the end 22 but spaced inwardly from it; the hole is centrally arranged in the web at a distance from the end in the range of between five-eighths of an inch to seven-eighths of an inch. The hole preferably is circular and of a diameter of slightly greater than three-eighths of an inch to accommodate the conventional size rear axle shaft for use on a bicycle, as illustrated in the drawing. In use, the holder 18 is mounted to the member 14 in the following manner. The shaft 14 is passed through the hole 38 with the flanges being directed outwardly as shown to nest the flag staff protectively within the space between the rigidifying flanges and the web with the web abuttingly engaging the end portion of brace 40, which is also conventionally found mounted on a bicycle to support the rear fender. Thereafter, the keeper nut 20 is applied to cause the surface of the web 32 to abuttingly overlay the lower distal end 46 of the brace or nut and to hold the flag holder in a vertically oriented upstanding position, see FIG. 1. Once the nut 20 has been securely tightened against the exterior surface of the web, it will resist a tendency to loosening rotation by wind forces when the vehicle is traveling and additionally, the holder cannot be removed except by the use of a tool to threadably withdraw the keeper nut.

The holding means for the staff of the flag holder will now be described. The holding means comprises a pair of socket defining members 48 and 50 which are integral with the holder and comprise lateral members cut and pressed out of the web at spaced locations, the lower member being designated by the numeral 48 and the upper member being designated by the numeral 50. Each of the members is located adjacent, but inwardly of, its associated holder end, 22 and 24 respectively, at a distance greater than seven-eighths of an inch from the end and preferably at least one and one-eighth of an inch, but not more than 2 inches, with the sockets being spaced from one another a distance of greater than two and one-half inches and preferably about 3 inches to provide spaced holding zones for the staff. Each of the lateral members 48 and 50 includes a first leg 54 and a second leg 56, both of a common length and converging outwardly between the flanges to a rounded apex 58 from a zone of juncture with the web at about its juncture with the flange adjacent thereto. The distance of the apex from the web surface is substantially equal to the diameter of a round conventional flag staff often used on bicycles of about one-quarter inch to snuggly receive and hold it as illustrated in FIG. 1; and, preferably, the flange shields extend over half that distance from the web plane.

Optional mounting means are provided in the other end of the holder web, as will now be described. An elongate longitudinally extending central slot 60, open at the end, is provided to dwell on the axle and to be held in position by the nut 20 when the holder is reversed with respect to the position shown in FIG. 3 and the flag staff is inserted from the end 22. This type of mounting means is preferred by some riders so that they can remove the holder with a quick upward jerk and replace it, thereafter tightening the nut somewhat against it.

What is claimed is:

1. A holder for receiving and holding in a generally vertical orientation a flag staff which is generally circular in cross section for display of a flag on the staff, said holder being adapted to be mounted on a vehicle having a surface with a protruding threaded member comprising:

a one-piece body having a generally planar elongate web, said web having a first and a second end zone with an opening in each, the opening in said first end zone being a through hole spaced from the adjacent end and sized for passage of said threaded protruding member and adapted to be secured thereto by a nut threadably advanced towards said surface to press the web into abutting engagement therewith, the opening in said second end zone being a longitudinally extending slot opening at the adjacent end and extending longitudinally into said end zone, said slot being sized to receive the threaded protruding member, and rigidifying means on the longitudinally extending edges of said web in the form of generally parallel flange shields spaced from one another and extending in a common direction and defining a U-shaped space between the flanges and web, each of said end zones including means for holding a flag staff, each of said holding means being spaced inwardly of the adjacent opening, and each of said holding means comprising a generally lateral member having a first leg and a second leg, each of said legs being of a common length and being connected to the web at about the zone of juncture of the adjacent flange and converging outwardly in said space and being connected to the converging leg at a rounded apex, each of said flange shields extending a distance at least greater than one-half the distance of said apex from said web, and the distance of said apex from the plane of said web being substantially equal to the diameter of the flag staff, whereby a shaft passed longitudinally between the legs of each holding means in the central region of the space will be shielded and protectively housed between the flanges and web and captivated by the legs of said holding means against the web; and a nut having a threaded bore sized for threaded advancement on the protruding threaded member to captivate the body on said member; and said web including a lateral portion intermediate the holding means and the adjacent opening in the respective end zone portions.

2. The device as set forth in claim 1 wherein said body is of metal.

3. The device as set forth in claim 2 wherein said metal is of 16 gauge.

4. The device as set forth in claim 1 wherein said body is of rigid plastic material.

* * * * *